(12) United States Patent
Oldenettel

(10) Patent No.: US 6,327,904 B1
(45) Date of Patent: Dec. 11, 2001

(54) METHOD FOR DETERMINING THE TREAD DEPTH OF A VEHICLE TIRE WHILE THE VEHICLE IS MOVING

(75) Inventor: Holger Oldenettel, Garbsen (DE)

(73) Assignee: Continental AG (DE)

( * ) Notice: Subject to any disclaimer, the term of this patent is extended or adjusted under 35 U.S.C. 154(b) by 0 days.

(21) Appl. No.: 09/063,901

(22) Filed: Apr. 21, 1998

(30) Foreign Application Priority Data

Apr. 21, 1997 (DE) .............................................. 197 16 586

(51) Int. Cl.$^7$ .............................. E01C 23/00; B01C 23/02
(52) U.S. Cl. .............................................. 73/146; 73/146.2
(58) Field of Search .................................. 73/146, 146.2, 73/146.3, 146.4, 146.5, 146.8, 457, 458, 459, 460, 462, 463, 464, 465, 467, 468, 469, 470–479; 116/30, 34 R

(56) References Cited

U.S. PATENT DOCUMENTS

| | | | |
|---|---|---|---|
| Re. 28,775 | * | 4/1976 | Tarpinian ............................. 73/146 |
| 3,918,816 | * | 11/1975 | Foster et al. ......................... 356/167 |
| 4,472,974 | * | 9/1984 | Dickson et al. ....................... 73/635 |
| 5,913,240 | * | 6/1999 | Drahne et al. ......................... 73/146 |

FOREIGN PATENT DOCUMENTS

| | | |
|---|---|---|
| 3236520 | 4/1984 | (DE) . |
| 4435160 | 4/1996 | (DE) . |
| 1951421 | 10/1996 | (DE) . |
| 1952391 | 1/1997 | (DE) . |

* cited by examiner

*Primary Examiner*—Benjamin R. Fuller
*Assistant Examiner*—Abdullahi Aw-Musse
(74) *Attorney, Agent, or Firm*—R.W.Becker & Associates; R. W. Becker

(57) ABSTRACT

A method for determining the tread depth of a vehicle tire during driving includes the step of determining the angle of a radially outer tire location relative to hub-based a coordinate system based of the vehicle tire by a sensor fastened to the vehicle. A signal containing harmonic oscillation sent by the sensor is then analyzed and, based on the signal, the resonant frequency is determined corresponding to the torsional oscillation component of the tire belt relative to the wheel. The mass moment of inertia of the tire belt about the axis of rotation is then computed based on the torsional stiffness of the tire sidewall and the determined resonant frequency. The actual mass and changes of the tire diameter are then calculated based on the computed mass moment of inertia and based on a mass function of the vehicle tire that is a function of the tire diameter. The loss of tread depth is then calculated based on the changes of the tire diameter.

4 Claims, 1 Drawing Sheet

METHOD FOR DETERMINING THE TREAD DEPTH OF A VEHICLE TIRE WHILE THE VEHICLE IS MOVING

BACKGROUND OF THE INVENTION

The present invention relates to a method for determining the tread depth of a vehicle tire while the vehicle is moving.

From German patent application 19 523 917 a method for determining the tread depth of a vehicle tire while the vehicle is moving is disclosed. Based on the measured values for the vehicle velocity and the measured values of wetness sensors, that detect the water spray caused by the tires when driving on a wet road surface, with the aid of a characteristic line field the tread depth of the vehicle tire is determined.

From German patent application 32 36 520 a method for detecting the tread depth of vehicle tires while the vehicle is driving can be taken whereby, based on the measured values of the rpm sensors at the wheels and on determined reference velocities, long term changes of the tire state (wear) and thus the actual tread depth are deduced.

From German patent application 195 14 219 a method for determining the tread depth of vehicle tires can be taken in which the momentary value of the tread depth is determined based on the initial tread depth $PT_0$, a specific tire wear, which incorporates a driving behavior-proportional value SK1 determined continuously during driving by different sensors, and the driven miles.

From German Offenlegungsschrift 44 35 160 a device for determining the circumferential force of a vehicle wheel is known which functions without contacting the wheel. At least one first sensor element is provided in the sidewall of the tire which generates, when passing a sensor provided at the vehicle, a signal that is used for determining the angular position of an outer vehicle tire point relative to a hub-based coordinate system that rotates with the tire. The hub-based coordinate system is represented either by a second sensor and a second vehicle-attached sensor or by an ABS sensor of the vehicle mounted on the wheel hub.

It is therefore an object of the present invention to use the signal provided by the sensor for determining the tread depth of the vehicle tire while the vehicle is moving.

SUMMARY OF THE INVENTION

The inventive method for determining the tread depth of a vehicle tire while the vehicle is driving is primarily characterized by:

a) determining an angle of a radially outer tire location relative to a hub-based coordinate system by a sensor fastened to the vehicle, whereby the sensor circuits a corresponding signal;

b) analyzing the signal containing harmonic oscillation sent by the sensors;

c) determining based on the signal a resinate frequency corresponding to the torsional oscillation component of the tire belt relative to the wheel;

d) computing a mass moment of inertia of the tire belt about the axis of rotation based on a torsional stiffness of the tire sidewall and the determined resonant frequency;

e) calculating the actual mass and changes of the tire diameter based on the computed mass moment of inertia and based on a mass function of the vehicle tire that is a function of the tire diameter;

f) calculating a loss of tread depth based on the changes of the tire diameter.

Preferably, in step d) the torsional stiffness of the tire sidewall is determined based on the angle of the outer tire location relative to the coordinate system for a known drive moment and known circumferential force of the vehicle tire in a defined driving condition of the vehicle.

According to the present invention the determination of the tread depth is carried out with the following steps:

determining the angle of an outer tire location relative to a hub-based coordinate system by a sensor attached to the vehicle;

analyzing the signal supplied by the sensor and containing harmonic oscillation and determining the resonant frequency which corresponds to the torsional oscillation component of the tire belt relative to the wheel;

computing the mass moment of inertia of the tire belt about the axis of rotation based on the torsional stiffness of the sidewall and the determined resonant frequency;

calculating the actual mass and the changes of the tire diameter based on the determined mass moment of inertia and the mass function of the tire that is a function of its diameter;

calculating the tread loss based on the changes of the tire diameter.

In a preferred embodiment of the invention it is suggested to determine the torsional stiffness of the tire sidewall based on the angle of the outer tire location relative to the coordinate system that rotates with the wheel for a known drive moment and thus known circumferential force of the tire in a defined driving state of the vehicle. This avoids, when changing the tire, having to manually enter a value corresponding to the torsional stiffness of the sidewall into the memory of a device provided at the vehicle for performing the inventive method.

BRIEF DESCRIPTION OF THE DRAWING

The object and advantages of the present invention will appear more clearly from the following specification in conjunction with the accompanying only drawing FIG. 1 in which a vehicle wheel 10 is schematically shown.

DESCRIPTION OF PREFERRED EMBODIMENTS

Figure 1:
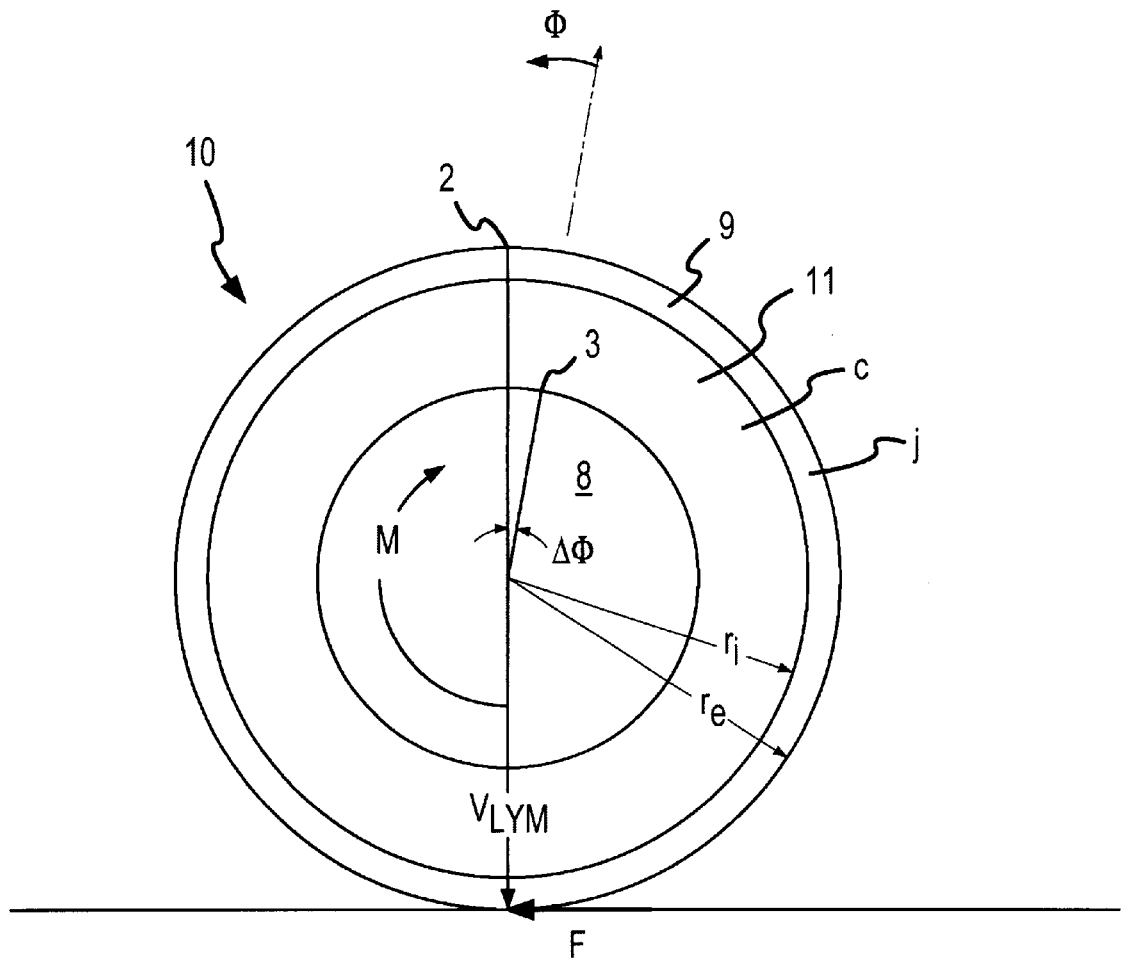

The present invention will now be described in detail with the aid of a specific embodiment utilizing the only FIG. 1.

The wheel 10 has two radially spaced transducer elements 2 and 3 which cooperate with non-represented sensors provided at the vehicle, as is disclosed, for example, in German patent application 44 35 160, the disclosure of which is herewith incorporated by reference.

The transducer 3 can be used for defining a coordinate system that rotates with the hub. The angle $\Delta\phi$ between the two radii of the transducer elements 2 and 3 can thus be expressed as the angular position $\phi$ of the transducer element 2.

The angle $\Delta\phi$, respectively, the displaced angular position "$\phi$" of the outer tire location, respectively, the transducer element 2 is the result of the driving torque M that tensions the belt 9 relative to the wheel 8 or rim of the vehicle wheel 10 and tire assembly. The resulting stress or tension is a function of the torsional stiffness c of the sidewall 11 of the tire.

Assuming for reasons of simplification that the tire mass is concentrated in the belt 9, the tire can be comparatively easily defined with respect to oscillation technological aspects. The fixedly positioned belt 9 can perform rotational oscillations about the rim 8 whereby these rotational oscillations can be detected within the sensor signal of the sensor cooperating with the transducer element 2.

The movement of the induced rotational oscillation in the form of the belt 9 can be described in approximation as follows:

$$J\ddot{\phi}+c\phi=\hat{M}\times\cos\Omega t \qquad (1)$$

In equation (1) J is the mass moment of inertia of the belt 9 about the axis of rotation, the two dots above the symbol define, as is conventional, the second derivative over time, i.e., the angular acceleration, c is the torsional stiffness of the tire sidewall 11, and the right side of the equation describes the exitation at a frequency Ω which may be the result of non-uniform driving force provided by the internal combustion engine powering the vehicle. Damping by the rubber material is neglected in this equation.

When only the homogeneous portion of the equation is considered, the following equation results:

$$J\ddot{\phi}+c\phi=0 \qquad (2)$$

This represents, as is known, a homogeneous linear differential equation of the second order with constant coefficients.

The general equation $$\phi=A\times\cos\omega t+B\times\sin\omega t \qquad (3)$$

provides with the intrinsic frequency $$\omega=\omega_0=\sqrt{c/J} \qquad (4)$$

the general homogeneous solution.

It is known that passenger car tires have a very pronounced torsional frequency in the range between 40 and 60 Hz. With the aid of Fourier analysis or other mathematical methods, analysis the signal produced by the transducer 2 shows that it contains an intrinsic or own frequency within the harmonic oscillations, and this frequency is the required own frequency of the tire.

For known torsional stiffness c of the tire sidewall 11, it is thus possible to determine contact-free via the own frequency of the mass moment of inertia of belt 9 and to determine, based on the changing mass moment of inertia, the mass change of the tire as well as values that describe it geometrically.

In order to determine the torsional stiffness c, it is possible to use for a known, i.e., defined, driving condition or state of the vehicle the following equation:

$$\hat{M}=F_{wheel}\times r_{dyn}=C\times\phi \qquad (5)$$

The driving torque can be measured at the drive shaft or can be calculated for a known driving state from $F_{wheel}$.

The mass moment of inertia of the belt 9 about the axis of rotation can be defined, when assuming that the belt is a hollow cylinder, as follows:

$$J=m\times\frac{(r_a^2+r_i^2)}{2} \qquad (6)$$

When two different states are taken into consideration, then the following equations result:

$$J_{old}=m_{old}\times\frac{(r_{a/old}^2+r_i^2)}{2} \qquad (7)$$

and $$J_{new}=m_{new}\times\frac{(r_{a/new}^2+r_i^2)}{2} \qquad (8)$$

Furthermore, the following equation is to be considered:

$$m_{new}=m_{old}-m_{wear} \qquad (9)$$

For wear of the tire the following differential equation can be formulated:

$$dm_{wear}=-\rho_{rubber}\times f_R\times b\times 2\pi r\times dr \qquad (10)$$

In this equation ρ defines the density of the rubber, $f_r$ is a shape factor for determining the negative portion of the tread, b is the width of the tire, 2πr is the circumference as a function of the radius, and dr is the difference in the radius, i.e., the reduced tire radius.

When integrated, the following equation results:

$$m_{wear}=-\rho_{rubber}\times f_R\times b\times 2\pi r\times \int_{r_{a/old}}^{r_{a/new}} r\,dr \qquad (11)$$

and leads to the following equation:

$$m_{wear}=-\rho_{rubber}\times t_R\times b\times 2\pi r\times \left(\frac{r_{a/old}^2}{2}-\frac{r_{a/new}^2}{2}\right) \qquad (12)$$

The described equation system comprised of equations 7, 8, 9 and 12 can be solved for $r_{a/old}$. Thus, the tire wear, respectively, the reduced tread depth is known. New tires have a tread depth of 8 to 9 mm; when a tread depth 1.6 mm has been reached, it is necessary to change the tires.

When it is desired to detect the tread depth of the tire, respectively, the tire wear with a resolution of 1 mm, the following estimate can be provided. A new tire weighs approximately 10 kg and loses, when the tread depth is reduced from 9 mm to 8 mm, approximately 200 g of its weight. This is a mass reduction of approximately 1/20. The frequency defined by equation 9 changes by 1/40. When the frequency $w_0$, as mentioned before, is in the range of 40 to 50 Hz, then the frequency can be determined with a resolution of 1 Hz. Experiments have shown that this can be achieved inexpensively by means of modern Fourier analysis with on-board devices provided of the vehicle.

The specification incorporates by reference the disclosure of German priority document 197 16 586.9 of Apr. 21, 1997.

The present invention is, of course, in no way restricted to the specific disclosure of the specification and drawings, but also encompasses any modifications within the scope of the appended claims.

What is claimed is:

1. A method of using a signal provided by a sensor which senses torsional deformation of a vehicle tire while the vehicle is driving, comprising the steps of:
   determining a harmonic oscillation component being contained within the signal produced by said sensor when being passed by a transducer, and determining a resonant frequency of said harmonic oscillation component, and determining a tread depth of a vehicle tire while the vehicle is driving including the steps of:

selecting an angle of a radially outer tire location relative to a hub-based coordinate system by fastening said sensor to the vehicle;

determining, based on said signal, sent by the sensor and containing harmonic oscillations, a resonant frequency corresponding to a torsional oscillation of a tire belt relative to the wheel, said torsional oscillation being a component of a complete torsional tire deformation;

computing a ratio of a mass moment of inertia relative to a torsional stiffness of the tire belt about an axis of rotation based on a torsional stiffness of a tire sidewall and the determined resonant frequency;

calculating an actual mass and changes of a diameter of said tire based on the computed mass moment of inertia and based on a mass function of the vehicle tire diameter; and calculating a loss of tread depth based on the changes of the tire diameter.

2. A method according to claim 1, wherein the step of computing a ratio includes determining the torsional stiffness of the tire sidewall based on the angle of the outer tire location relative to the hub-based coordinate system for a known drive moment and known circumferential force of the vehicle tire in a defined driving condition of the vehicle.

3. A method according to claim 1, wherein, during driving, the torsional deformation of the tire having a tire sidewall is sensed in a contact-free manner by measuring time intervals between passings of transducers along sensors, said transducers being fixed in two rows of different radii, wherein at least the transducers of a radially outer row are fixed on said tire sidewall.

4. A method according to claim 1, including:

inputting into a computer information about the torsional stiffness of a tire sidewall as well as the resonant frequency of the harmonic oscillation component of the torsional deformation; and computing with the computer a mass moment of inertia of those tire components which are positioned radially outside the tire sidewall resulting in an information about the momentary remaining tread depth.

* * * * *